United States Patent [19]

Kawano

[11] Patent Number: 4,702,527
[45] Date of Patent: Oct. 27, 1987

[54] BUILT-UP WHEEL FOR VEHICLES

[75] Inventor: Akio Kawano, Saitama, Japan

[73] Assignee: Honda Giken Kogyo Kabushiki Kaisha, Tokyo, Japan

[21] Appl. No.: 714,193

[22] Filed: Mar. 20, 1985

[30] Foreign Application Priority Data

Mar. 21, 1984 [JP] Japan .................................. 59-53750
Jul. 17, 1984 [JP] Japan ................................ 59-148239

[51] Int. Cl.⁴ ............................ B60B 1/14; B60B 5/02
[52] U.S. Cl. .............................. 301/9 DN; 301/9 DP; 301/63 PW
[58] Field of Search ............ 301/9 AN, 9 DN, 9 DP, 301/9 SB, 63 R, 63 PW; 152/323

[56] References Cited

U.S. PATENT DOCUMENTS

| | | | |
|---|---|---|---|
| 2,309,257 | 1/1943 | Scarlett | 301/9 SB |
| 2,871,647 | 2/1959 | Schsade et al. | 301/63 PW X |
| 2,940,781 | 6/1960 | Erikson | 301/63 PW |
| 3,811,737 | 5/1974 | Lejeune | 301/63 PW |
| 3,907,370 | 9/1975 | Bard | 301/63 R |
| 4,483,214 | 11/1984 | Mayer | 301/63 PW X |
| 4,489,184 | 12/1984 | Woelfel | 301/63 PW X |
| 4,508,392 | 4/1985 | LeBlond et al. | 301/63 PW |
| 4,532,097 | 7/1985 | Daniels et al. | 264/258 |

FOREIGN PATENT DOCUMENTS

| | | | |
|---|---|---|---|
| 1225376 | 6/1960 | France | 152/323 |
| 579294 | 7/1958 | Italy | 301/9 DN |
| 197432 | 5/1923 | United Kingdom | 301/9 DN |
| 2093778 | 9/1982 | United Kingdom | 301/63 PW |

Primary Examiner—David A. Scherbel
Attorney, Agent, or Firm—Lyon & Lyon

[57] ABSTRACT

In a built-up wheel having a hub and a wheel body which are connected with each other detachably by fastener means, the hub consists of a bearing cylinder and a wheel support member formed integrally with the bearing cylinder, while the wheel body is provided with a boss which is connected with the wheel support member by the fastener means, the boss being provided with an inner cylindrical portion formed integrally therewith so as to extend in the axial direction thereof for fitting engagement with the outer circumferential portion of the bearing cylinder. The hub and wheel body are formed of different kinds of synthetic resins. The modulus of tensile elasticity of the synthetic resin constituting the hub is set higher than that of the synthetic resin constituting the wheel body.

30 Claims, 9 Drawing Figures

BUILT-UP WHEEL FOR VEHICLES

BACKGROUND OF THE INVENTION

This invention relates to a built-up wheel suitably used for vehicles, especially, two-wheel vehicles.

Various types of built-up wheels for vehicles have heretofore been proposed, each of which consists of parts of different materials, which are combined together unitarily by fastening means, such as bolts, so as to reduce the weight of the wheel. These built-up wheels include, for example, a built-up wheel disclosed in Japanese Utility Model Laid-open No. 36077/1980 which is made by fastening a rim of synthetic resin and a metallic wheel disc to each other unitarily in their radial direction by bolts, and a built-up wheel disclosed in Japanese Utility Model Publication No. 26805/1983 and made by engaging a rim of synthetic resin and a metallic wheel disc with each other in their axial direction and fastening the engaged portions to each other unitarily by bolts. Although these built-up wheels have a smaller weight, stress tends to be concentrated in the fastened portions of the rim and wheel disc. This poses problems in the strength and durability of the built-up wheels so that such built-up wheels are substantially not suitable to be put to practical use.

Moreover, in the above-mentioned built-up wheels, mud and soil are deposited on the portions thereof which are fastened together by bolts. It is troublesome to clean such soiled portions, and such deposit on the wheels spoil the external appearance thereof. Namely, these built-up wheels have various kinds of faults.

There is a known built-up wheel in which a main portion except the tire is formed of synthetic resin. Such a built-up wheel of synthetic resin is inferior in the strength and rigidity to a metallic built-up wheel. If a wheel as a whole is formed of a recently-developed fiber-reinforced synthetic resin of a high modulus of tensile elasticity (3000–70000 kg/mm$^2$), such as a carbon fiber-reinforced resin so as to eliminate these faults of the wheel of synthetic resin, the reduction of the manufacturing cost and weight thereof, which is a basic object of the production of built-up wheels of synthetic resin, cannot be attained since the above-mentioned reinforced resin has an extremely high price and a high specific gravity (1.74–1.84).

SUMMARY OF THE INVENTION

A primary object of the present invention, which has been developed in view of the above-mentioned facts, is to provide a built-up wheel consisting of separately-formed hub and wheel body and having a high overall strength, a high durability, a small weight, a simple construction and a low price, the built-up wheel being designed so as to prevent stress from being concentrated in the fastened portions of the hub and wheel body, improve the strength of the fastened portions and their surrounding portions to a great extent and distribute the stress evenly over the hub and wheel body.

From a first aspect of the present invention, it is provided in order to achieve the above object a built-up wheel for vehicles, which consists of a hub, a wheel body formed separately from the hub, and fastener means for detachably combining the hub and wheel body with each other, the hub being provided with a bearing cylinder, and a wheel support member formed integrally with and extending from the bearing cylinder, the wheel body being provided at its outer circumferential portion with a rim on which a tire is to be set, and at its inner circumferential portion with a boss which is combined with the wheel support member by the fastener means, the boss being provided with a cylindrical portion which is formed integrally therewith, fitted around the outer circumferential portion of the bearing cylinder and extending axially from the inner circumferential portion of the boss.

In the above arrangement, the hub and wheel body are formed separately and combined unitarily by the fastener means to obtain a built-up wheel. This enables the production of the built-up wheel at a low cost. Moreover, built-up wheels of different designs and forms can be obtained easily.

Since the boss of the wheel body has a cylindrical portion formed integrally therewith, extending axially from the inner circumferential portion thereof and fitted around the bearing cylinder of the hub, the stress working on the hub and wheel body can be distributed thereover through the engaged portions thereof. Therefore, stress concentration does not occur in the combined portions of the hub and wheel body. This enables the strength and durability of the built-up wheel as a whole to be improved greatly.

If in the above arrangement the boss of the wheel body is formed to include a joint member attached to the wheel support member of the hub by fastener means, an inner cylindrical portion formed integrally with the support member and extending axially from the inner circumferential portion thereof toward the inner circumferential portion of the joint member, an outer cylindrical portion formed integrally with the support member and extending axially from the outer circumferential portion thereof, and radially extending reinforcement ribs for connecting and reinforcing the inner and outer cylindrical portions, the modulus of section of the surrounding portions of the combined portions of the hub and wheel body becomes very high. Accordingly, the strength of the combined portions of the hub and wheel body can be improved markedly, and the rigidity and durability of the built-up wheel as a whole can also be improved. Especially, when the wheel body is formed of synthetic resin, a decrease in the strength thereof can be compensated sufficiently, so that a built-up wheel having a small weight and a desired rigidity can be obtained.

If the above arrangement is further modified by providing a plurality of ribs on the outer circumferential portion of the bearing cylinder in such a manner that the ribs are formed integrally with, spaced in the circumferential direction of and extend in the radial direction of the bearing cylinder, and if the inner cylindrical portion formed on the boss of the wheel body, which is joined to the hub by the fastener means, is fitted around the outer circumferential portions of the ribs, a load imparted to the wheel body can be distributed uniformly and efficiently from the cylindrical portion to the whole circumference of the boss via these ribs. Accordingly, the weight of the hub can be reduced with no unduly large load imparted locally thereto. Especially, the stress concentration in the combined portions of the hub and wheel body can be prevented. Consequently, the strength and durability of the built-up wheel as a whole can be improved.

Moreover, when the wheel body is formed of synthetic resin, a decrease in the strength thereof can be compensated sufficiently, and the previously-mentioned features can be effectively displayed.

If the above arrangement is modified by: forming a one-side-opened cross-sectionally channel-shaped recess by a joint member via which the boss of a wheel body is attached to the wheel support member of a hub by a fastener means, an inner cylindrical portion formed integrally with and extending from the inner circumferential portion of the joint member, and an outer cylindrical portion formed integrally with and extending axially from the outer circumferential portion of the joint member; housing the fastener means in the channel-shaped recess; and putting a cover over the opened side portion of the recess, a cross-sectionally closed structure consisting of the boss and cover is obtained around the fastener means, and the cover works as a reinforcing material for the wheel body. This enables the strength of the combined portions of the wheel body and hub to be improved greatly, and the rigidity and durability of the built-up wheel as a whole to be also improved. Therefore, even when the wheel body is formed of synthetic resin, the required level of strength of the wheel can be secured reliably.

Since the cover encloses the fastener means in cooperation with the boss, the fastener means is not exposed to the outside, and the mud, soil and dust are not deposited in and on the recessed or projecting parts of the combined portions of the wheel body and hub. Accordingly, the cleaning and maintenance of the wheel can be done easily, and the appearance thereof can be kept beautiful.

If the wheel body is formed of a synthetic resin with the hub formed of a metal, the weight of the built-up wheel as a whole can be reduced, and the durability of the metallic hub, which bears a comparatively large load, can be kept superior. Therefore, a built-up wheel which is free from strength problems can be obtained.

Moreover, when a heat generating device, such as a brake unit and a driving unit is attached to this metallic hub, the influence of heat upon the wheel body of a synthetic resin can be effectively prevented. Accordingly, the degree of freedom of setting such a heat generating device increases, and the functions of the heat generating device can be sufficiently performed.

From a second aspect of the present invention, it is provided a built-up wheel for vehicles, in which a hub supported on a support shaft and a wheel body engaged with the hub are formed of different kinds of synthetic resins and combined together, the hub being formed of a synthetic resin of a high modulus of tensile elasticity, such as a carbon fiber resin, the wheel body being formed of a synthetic resin, such as nylon, of which the modulus of tensile elasticity is lower than that of the synthetic resin of the hub.

In this arrangement, the hub, which has a comparatively small capacity, and which receives large loads, such as the driving force, braking force and external force from the tire, is formed of a synthetic resin having a high price but high rigidity, strength and specific gravity, while the wheel body, which has a comparatively large capacity, and requires lower strength and rigidity than those of the hub, is formed of a synthetic resin of the kind which has lower rigidity and strength than those of the synthetic resin of the hub, but the price and specific gravity of which are low. Therefore, a light, inexpensive built-up wheel having desired overall strength and rigidity can be obtained.

If a plurality of reinforcing ribs are formed on at least one of the bearing cylinder and boss in the above-described arrangements, stress can be distributed more effectively, and, moreover, the weight of the built-up wheel as a whole can be further reduced.

The above and other objects as well as the advantageous features of the invention will become apparent from the following description of some preferred embodiments taken in conjunction with the accompanying drawings.

BRIEF DESCRIPTION OF THE DRAWINGS

FIGS. 1 and 2 illustrate a first embodiment of a built-up wheel according to the present invention, wherein:

FIG. 1 is a longitudinal section; and

FIG. 2 is a sectional view taken along the line II—II in FIG. 1.

FIGS. 3 and 4 illustrate a second embodiment of a built-up wheel according to the present invention, wherein:

FIG. 3 is a longitudinal section; and

FIG. 4 is a sectional view taken along the line IV—IV in FIG. 3.

FIGS. 5 and 6 illustrate a third embodiment of a built-up wheel according to the present invention, wherein:

FIG. 5 is a sectional view taken along the line V—V in FIG. 6; and

FIG. 6 is a sectional view taken along the line VI—VI in FIG. 5.

FIGS. 7-9 illustrate a fourth embodiment of a built-up wheel according to the present invention, wherein:

FIG. 7 is a sectional view taken along the line VII—VII in FIG. 8;

FIG. 8 is a sectional view taken along the line VIII—VIII in FIG. 7; and

FIG. 9 is a sectional view taken along the line IX—IX in FIG. 7.

DESCRIPTION OF THE PREFERRED EMBODIMENTS

The accompanying drawings show some embodiments of the built-up wheel according to the present invention.

Figure 1:
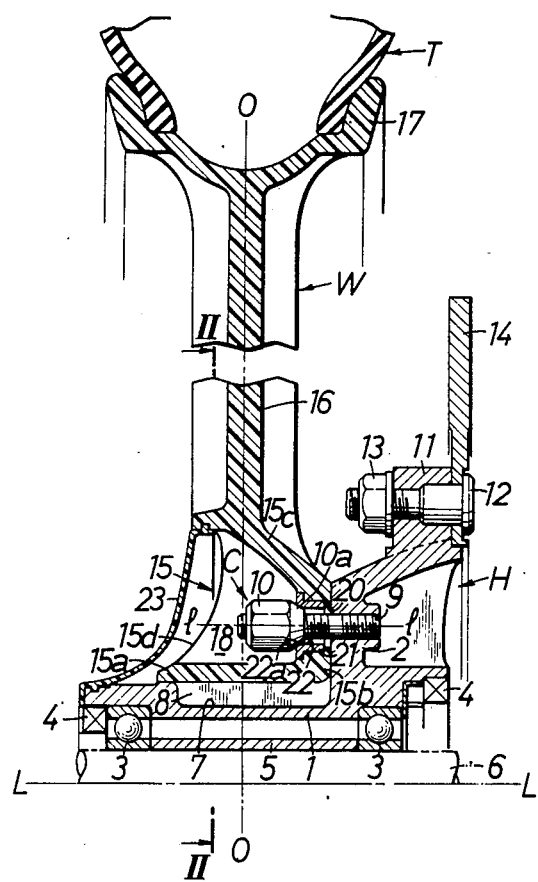
Figure 2:
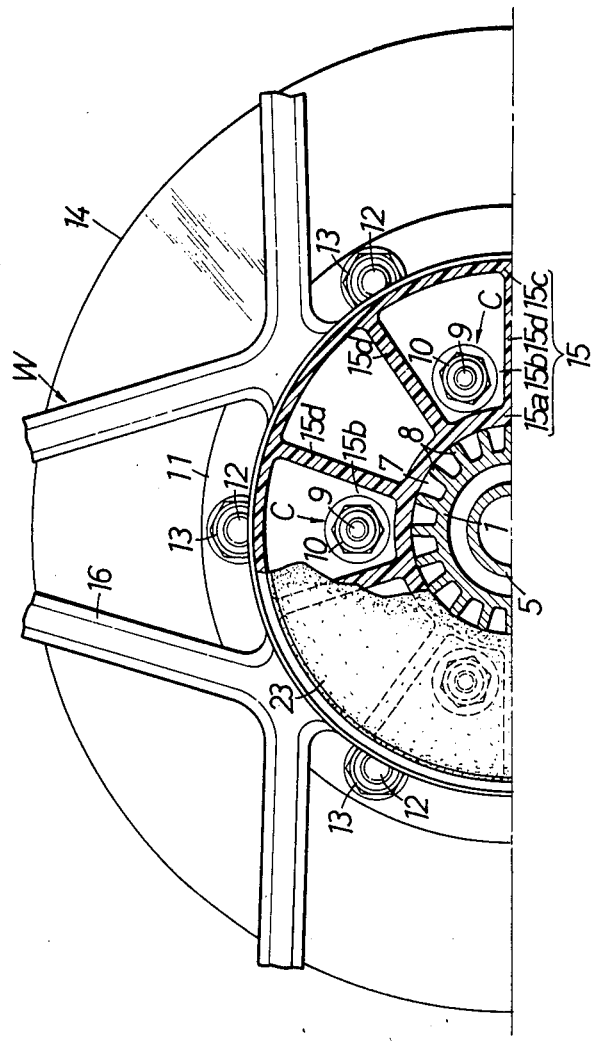

A first embodiment of the built-up wheel according to the present invention will now be described with reference to FIGS. 1 and 2. In this embodiment, a disc brake is attached to the built-up wheel.

The built-up wheel consists of a hub H, a wheel body W mounted detachably on the hub H, and a tire T set on the wheel body W.

First, the detailed construction of the hub H will be described. The hub H is made of a metal, such as an aluminum alloy and a magnesium alloy, and consists of a hollow bearing cylinder 1, and a wheel support member 2 formed integrally with and extending radially from one axial side portion of the bearing cylinder 1. Ball bearings 3, 3 are fitted in the inner circumferential surfaces of the left and right end portions of the bearing cylinder 1, and seal members 4, 4 are provided on the outer side of these ball bearings 3, 3. A collar 5 is provided between the inner side surfaces of the inner races of the ball bearings 3, 3, and a wheel axle 6 is inserted rotatably into the collar 5 and inner races of the ball bearings 3, 3.

An annular recess 7 is formed in an axially intermediate portion of the outer circumferential surface of the bearing cylinder 1, and a plurality of ribs 8 . . . which are spaced at regular intervals in the circumferential direction of the recess 7, are formed integrally with the annular recess 7 to extend in the radial direction. These ribs 8 . . . are formed so that the outer end surfaces thereof are substantially flush with the outer circumferential surface of the bearing cylinder 1. The wheel support member 2 extends from the outer circumferential surface of one axial side portion of the bearing cylinder 1 in the radially outward direction thereof at substantially right angles thereto. A plurality of stud bolts 9 . . . are implanted in the wheel support member 2 so that the stud bolts 9 . . . are spaced in the circumferential direction of the wheel support member 2. The axis l—l of each of the stud bolts 9 . . . is substantially parallel to the axis L—L of the bearing cylinder 1. The stud bolts 9 . . . and nuts 10 . . . which are engaged with the stud bolts 9 . . . and will be described later constitute a fastener means C.

A flange-like disc support member 11 is formed integrally with the wheel support member 2 in such a manner that the disc support member 11 extends from the outer circumferential surface of the wheel support member 2 in the radially outward direction. A brake disc 14 of a disc brake unit is attached to the outer side surface of the disc support member 11 by a plurality of locking bolts 12 . . . and nuts 13 . . . .

The construction of the wheel body W will now be described in detail. The wheel body W is made of a hard synthetic resin, and includes a boss 15, spiders 16 formed integrally with and extending in the radial direction of the boss 15, and a rim 17 formed integrally on the outer end surfaces of the spiders 16.

The boss 15 is formed to have a cross-section of a channel-like shape with an inner cylindrical portion 15a, which defines a boss bore, a joint portion 15b extending radially from one axial end of the inner cylindrical portion 15a, and an outer cylindrical portion 15c extending from the joint portion 15b diagonally in the radial direction so as to be connected to the spiders 16. A plurality of circumferentially-spaced and radially-extending reinforcing ribs 15d are provided between the inner and outer cylindrical portions 15a, 5c to integrally connect these cylindrical portions 15a, 5c for reinforcement thereof. An annular recess 18 opened at one side portion thereof which is opposed to the joint portion 15b is formed in the boss 15. The inner cylindrical portion 15a extends axially across a radial center line O—O of the rim 17 and a spider 16 and to left and right therefrom by substantially the same distance. The outer cylinder 15c also extends axially across this center line O—O. The joint portion 15b and the opened side portion of the annular recess 18 are positioned on the opposite sides of the center line O—O, and the reinforcing ribs 15d are provided so as to extend over both sides of the center line O—O. Owing to such a construction, a load imparted to the rim 17 can be borne effectively by this boss 15, and transmitted to the hub H. The joint portion 15b, i.e. a rear wall of the annular recess 18 is provided with a plurality of circumferentially-spaced bolt holes 20 . . . . These bolt holes 20 . . . are made in the positions which come into alignment with the plural stud bolts 9 . . . , which are implanted in the hub H, when the hub H and the wheel body W are put together. The stud bolts 9 . . . are inserted through the holes 20, and project at their front end portions into the interior of the annular recess 18. Poppet type washers 21 . . . are fitted in the plural bolt holes 20 . . . , and the outer surfaces of these washers 21 . . . are opposed to the inner side of the annular recess 18. The edge of a through bore 22 in each of the washers 21 which is on the side of the annular recess 18 is provided with a divergent tapering surface 22a.

An annular cover 23 of synthetic resin is engaged with an annular open end of the annular recess 18 in the boss 15 owing to the elastic force of the cover 23. Consequently, the boss 15 is formed to have a closed hollow structure defined by the inner cylindrical portion 15a, joint portion 15b, outer cylindrical portion 15c, and annular cover 23, increasing the strength of the boss 15. The maintenance work for the parts in the vicinity of the combined portions C can be carried out easily only by removing the annular cover 23.

The spiders 16 extend radially from the outer circumferential surface of the boss 15, and joined integrally to the rim 17. The rim 17 has a bifurcated cross-section like a regular rim, and the tire T is set therein.

In order to combine the wheel body W of a hard synthetic resin with the hub H, the inner cylindrical portion 15a of the boss 15 is fitted onto the outer circumferential surface of the bearing cylinder 1 of the hub H from one side thereof with respect to the axial direction thereof. During this assembling, the boss-bore-forming inner cylindrical portion 15a is fitted closely over the outer circumferential surface of the bearing cylinder 1 of the hub H and the outer end surfaces of the plural ribs 8 . . . , to take a position extending a long distance in the axial direction across the radial center line O—O of the rim 17 and spider 16. Accordingly, the fitting strength of the wheel body W and hub H can be improved. When the wheel body W and hub H are in engagement with each other, the joint portion 15b of the boss 15 engages with a side surface of the wheel support member 2 of the hub H, and the front end portions of the stud bolts 9 . . . implanted in the wheel support member 2 project into the interior of the annular recess 18 through the bolt holes 20 . . . and washers 21 . . . . When the nuts 10 . . . are screwed to the projecting end portions of the stud bolts 9 . . . , the wheel body W is fixed unitarily to the hub H. The tapering surfaces 10a formed at the base end portions of the nuts 10 engage closely with the tapering surfaces 22a of the washers 21 . . . , so that the wheel body W and hub H can be prevented from becoming eccentric. Accordingly, the wheel body W and hub H can be combined reliably.

The nuts 10 are caulked, or springs or plates are inserted thereon, so as to prevent the nuts from coming off.

The tire T is set in a conventional manner on the rim 17 provided at the outer circumferential portion of the wheel body W.

Figure 3:
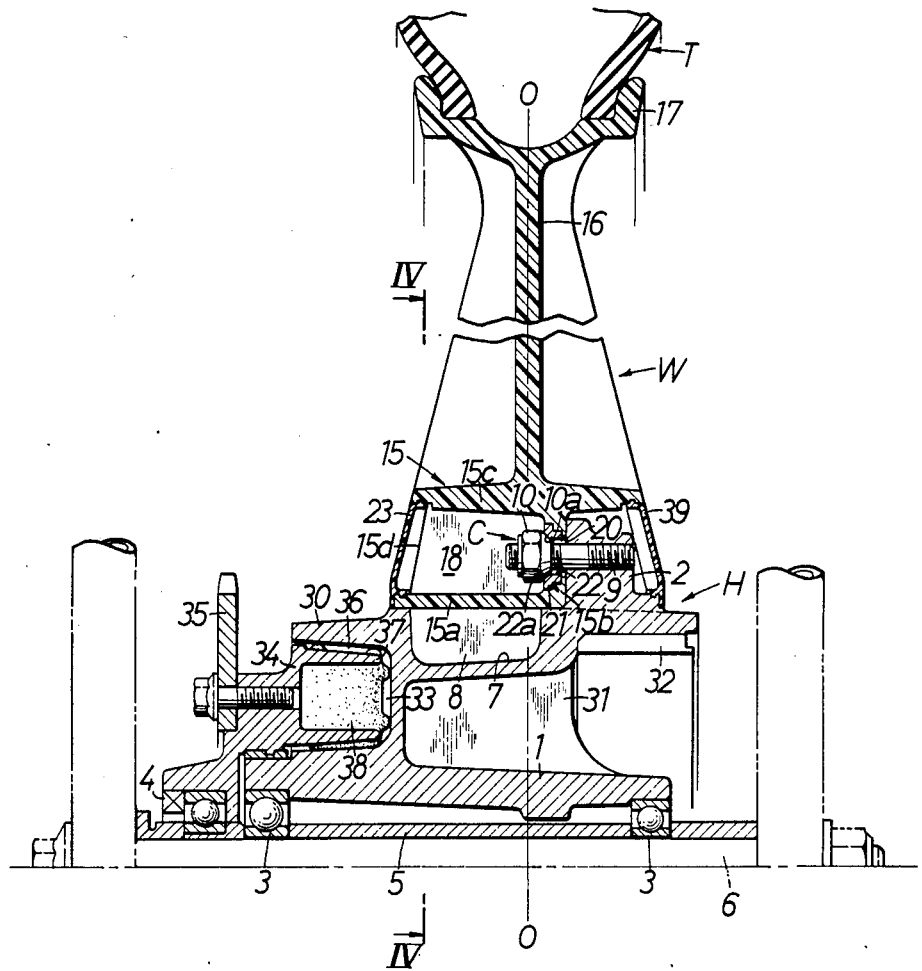
Figure 4:
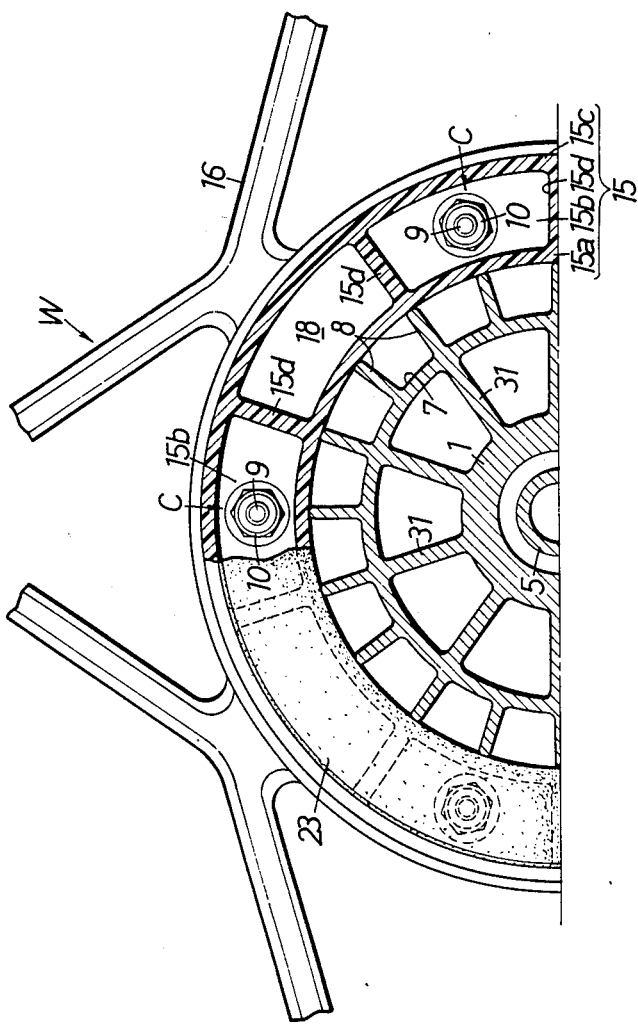

FIGS. 3 and 4 show a second embodiment of the present invention. In the second embodiment, a drum brake is provided on the wheel according to the present invention. The parts of the second embodiment which are identical with those of the first embodiment are designated by the same reference numerals and characters.

A bearing cylinder 1 of a metallic hub H is provided at its outer circumferential portion with a trunk portion 30 which is formed integrally therewith via ribs 31, and a flange-like wheel support member 2 is formed integrally with and at one axial side portion of the trunk portion 30. Stud bolts 9 for attaching a wheel body W to the wheel support member 2 are implanted in the latter. A brake drum 32 serving as a drum brake is set on the inner circumferential surface of one axial side section (right section in FIG. 3) of the trunk portion 30.

An annular recess 33 is formed in the other axial side section (left section in FIG. 3) of the trunk portion 30. A driving wheel 34 as a driving means rotatably supported on a wheel axle 6 is set firmly in this recess 33, and a sprocket 35 is attached to the driving wheel 34. The structure for combining the driving wheel with the hub H is known and will be described briefly. The annular recess 33 in the hub H is provided therein with a plurality of circumferentially-spaced driving plates 36 ... formed integrally with the wall of the same recess 33. A plurality of circumferentially-spaced driving members 37 ... are provided on one side portion of the driving wheel 34, the driving members 37 ... being formed integrally with the driving wheel 34 so as to project therefrom in one axial direction. These driving members 37 ... are inserted in the annular recess 33 via a plurality of dampers 38. When the driving wheel 34 combined unitarily with the sprocket 35 is rotated, the driving force thereof is transmitted to the hub H via the driving members 37 ..., dampers 38 and driving plates 36 ....

In the boss 15 of the wheel body W of synthetic resin, an annular recess 18 is defined by a boss-bore-forming inner cylinder 15a, a joint portion 15b and an outer cylinder 15c. In the annular recess 18, the inner and outer cylinders 15a, 15c are reinforced by a plurality of reinforcing ribs 15d which are formed integrally therewith and extending therebetween. The joint portion 15b is attached unitarily to the wheel support member 2 of the hub H by a plurality of stud bolts 9 ... and nuts 10 ... in the same manner as in the first embodiment described previously. An annular cover 23 of synthetic resin is put over the opened side of the annular recess 18 detachably by its own resiliency.

In the second embodiment, the outer cylinder 15c of the boss 15 also extends to the opposite side in the axial direction of the annular recess 18 so as to surround the outer circumferential portion of the flange-like wheel support member 2. An annular opened side portion defined by the outer cylinder 15c and hub H is fitted with an annular cover 39 of synthetic resin by its own resiliency, which cover is of substantially the same shape as the previously-mentioned annular cover 23. Accordingly, the stud bolts 9 ..., with which the nuts 10 are engaged, are enclosed at both ends of each thereof by these two annular covers 23, 39. The two annular covers 23, 39 are symmetric with respect to the radial center line O—O of the spiders 16 and a rim 17. This enables the left and right side surfaces of the wheel to have substantially the same outer appearance, and this wheel can be applied suitably to, especially, a motorcycle.

According to the first and second embodiments, the inner cylinder 15a of the boss 15 of the wheel body W is formed to have a large length in the axial direction of the wheel body W, and fitted with the outer circumferential surface of the hub H. Consequently, the area of engaged portions of the wheel body W and hub H increases, and a load imparted to the wheel body W is transmitted partially in a distributed manner from the inner cylinder 15a to the hub H. Accordingly, the stress concentration in the combined portions of the wheel body W and hub H can be prevented; the stress can be desirably distributed. This enables the strength and durability of the built-up wheel to be improved, and a decrease in the strength of the wheel body W of synthetic resin can be compensated. Since a heat generating device such as a brake unit is provided on the metallic hub, the influence of heat upon the wheel body W of synthetic resin can be minimized, and the degree of freedom of attaching the heat generating device to the hub can be increased. Moreover, the function of such a heat generating device is not spoiled. If a plurality of types of wheel bodies W are prepared for the hub H so as to combine the former with the latter selectively, built-up wheels of various specifications can be obtained at a low cost.

Since the hub which is obtained through many manufacturing steps can be made separately from the wheel body which has a comparatively large bulk, the manufacturing efficiency of the hub can be improved. This also serves to reduce the manufacturing cost of a built-up wheel.

Moreover, the direction in which the hub H and wheel body W are combined is in agreement with that in which the built-up wheel is mounted on a wheel axle. In addition, these assembling operations can be carried out by merely engaging nuts with stud bolts. Therefore, the assembling efficiency of the built-up wheel becomes very high.

Figure 5:
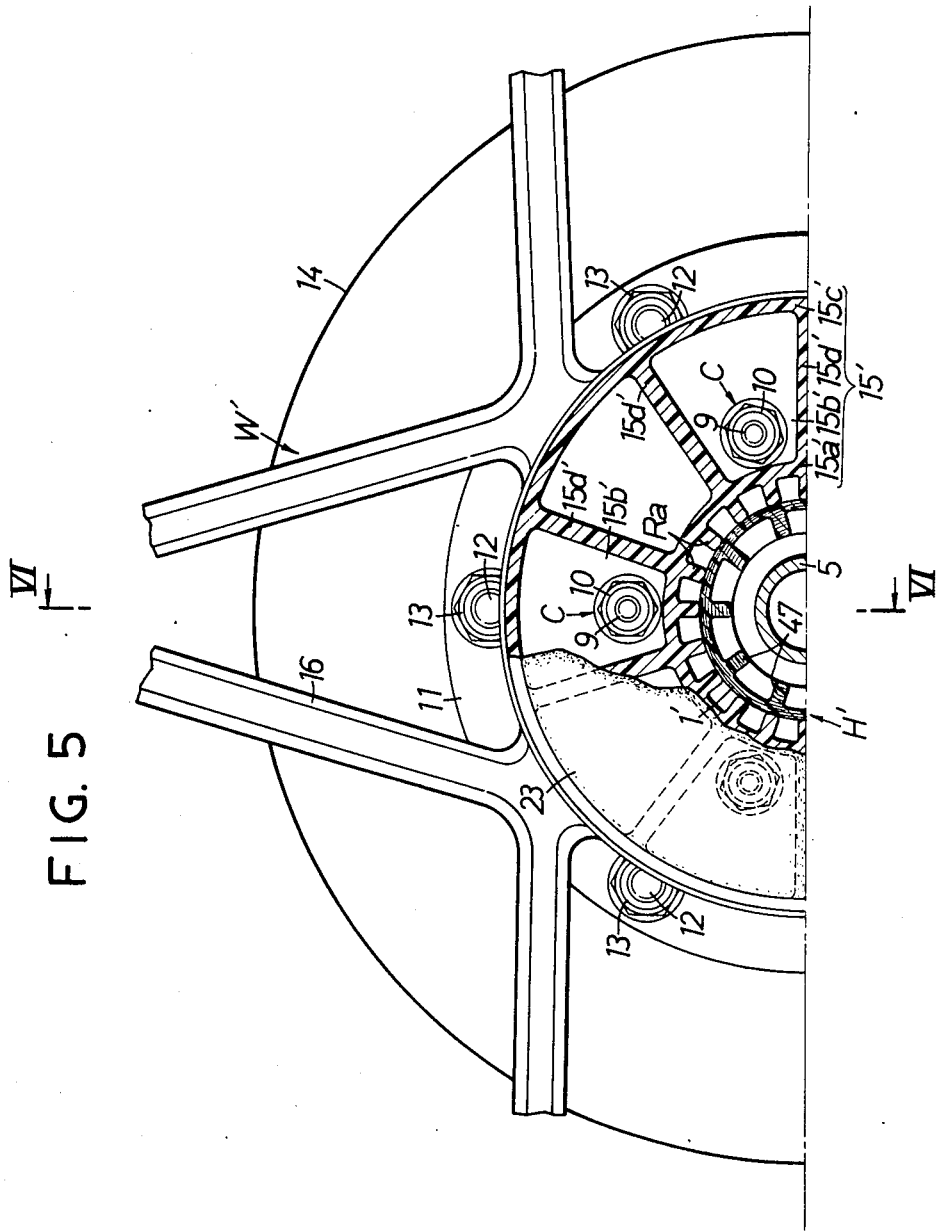
Figure 6:
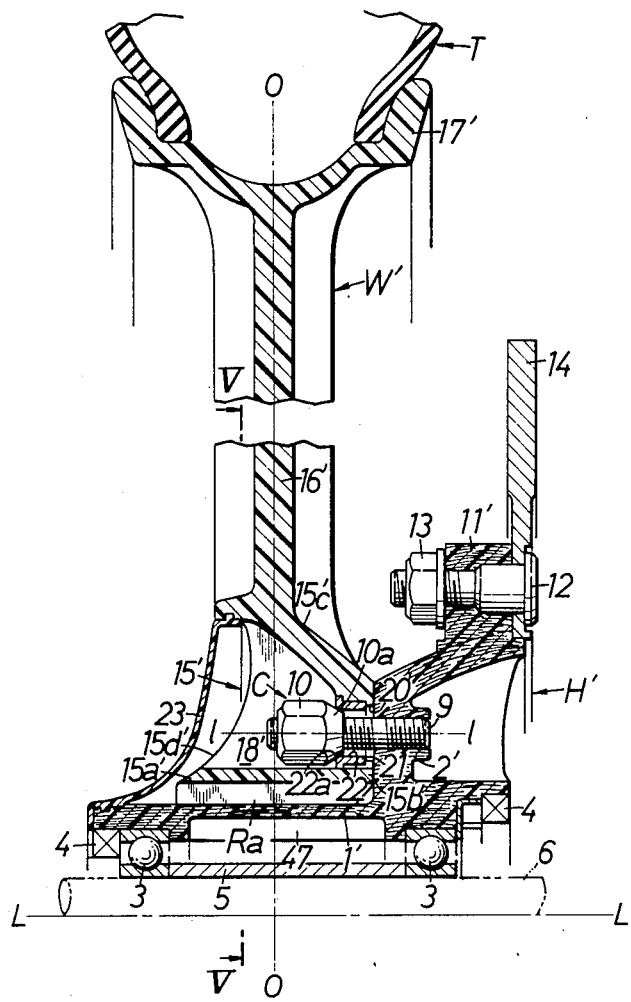

FIGS. 5 and 6 show a third embodiment of the present invention. This embodiment is different from the first and second embodiments in that a hub as well as a wheel body consist of synthetic resins. As clearly understood from the following description, however, the synthetic resins constituting the hub and wheel body are of different types and have different properties.

In the third embodiment, a disc brake is set on a built-up wheel, and the basic construction of the embodiment is identical with that of the first embodiment. Hence, the parts of the third embodiment which correspond to those of the first embodiment are designated by the same reference numerals and characters.

However, as clearly shown in FIG. 5, the third embodiment differs from the first embodiment in that a hub H' constituting a built-up wheel is formed of not a metal but a synthetic resin. To say more exactly, the hub H' is formed of a synthetic resin material having a high strength, a high rigidity and a high modulus of tensile elasticity (3000–70000 kg/mm$^2$), and more particularly a synthetic resin material which is generally called a fiber-reinforced resin, such as a carbon fiber epoxy resin and a boron fiber epoxy resin. On the other hand, the synthetic resin of which the wheel body W is formed is limited to a synthetic resin material with such a modulus of tensile elasticity (1000–6000 kg/mm$^2$) as lower than that of the synthetic resin of the hub H', and more particularly a nylon resin, a polycarbonate resin, an ABS resin, a polyacetal resin and an acetyl cellulose resin. The modulus of tensile elasticity of these resins is higher than those of a phenol resin, a polyester resin, a urea resin and a melamine resin, which are regularly used.

In addition, a bearing cylinder 1' constituting the hub H' is different from that in the first embodiment, i.e. the outer circumferential surface thereof is a smooth, cylindrical surface having no projections and recesses. Thus, the bearing cylinder 1' can be manufactured by a continuous cutting process. The inner circumferential surface of the bearing cylinder 1' is provided with a plurality of reinforcing members 47 ... which are formed integrally with the bearing cylinder 1' so that they are spaced at regular intervals in the circumferential direction thereof and extend inward in the radial direction thereof. These reinforcing members 47 ... axially extend between the ball bearings 3, 3 to reinforce that portion of the bearing cylinder 1' as located between those bearings.

A boss 15' constituting the wheel body W' is formed to have a cross-section of channel-like shape defined by a boss-bore-forming inner cylindrical portion 15a', a joint portion 15b' extending radially from one axial end of the cylindrical portion 15a', and an outer cylindrical portion 15c' extending diagonally in the radial direction. A plurality of reinforcing ribs 15d', 15d', which define combining spaces including fastener means C therein, are provided between the inner and outer cylindrical portions 15a', 15c' so that the ribs 15d', 15d' are formed integrally therewith and extend in the radial direction. These ribs 15d', 15d' reinforce the boss 15'. A one-side-opened annular recess 18' is formed in the boss 15'. The inner cylindrical portion 15a' extends axially across the radial center line O—O of a rim 17' and a spider 16' so that the length of the right and left sections of the inner cylindrical portion 15a' with respect to the center line O—O is substantially equal. In this embodiment, a plurality of wheel body-side ribs Ra . . . , which are formed integrally with the inner cylindrical portion 15a', project inward in the radial direction from inner circumferential surface thereof so that the ribs Ra . . . are spaced at substantially regular intervals in the circumferential direction of the inner cylindrical portion 15a'. The inner end surfaces of these ribs Ra . . . are on a concentric circle so that the inner end surfaces of the ribs Ra . . . can engage with the smooth outer circumferential surface of the bearing cylinder 1' of the hub H'. The outer cylindrical portin 15c' also extends axially across the center line O—O.

In order to combine the wheel body W' with the hub H', the boss bore in the inner cylindrical portion 15a' of the boss 15' is fitted around the outer circumferential surface of the bearing cylinder 1' of the hub H' from one axial side portion thereof. During this assembling operation, the wheel body-side ribs Ra . . . , which project inward from the inner circumferential surface of the boss-bore-forming cylindrical portion 15a', are fitted closely around the smooth outer circumferential surface of the bearing cylinder 1' to take a position extending a long distance in the axial direction across the center line O—O. Accordingly, the fitting strength of the wheel body W' and hub H' is further improved.

In this embodiment, a load from the rim 17' and spiders 16' can be transmitted in a distributed manner and more effectively to the hub H' via the ribs 15d' for the boss 15' and the wheel body-side ribs Ra. Since the hub H' is formed of a synthetic resin having a modulus of tensile elasticity higher than that of the synthetic resin of the wheel body W', the weight of the built-up wheel as a whole can be reduced with a required strength thereof retained.

Figure 7:
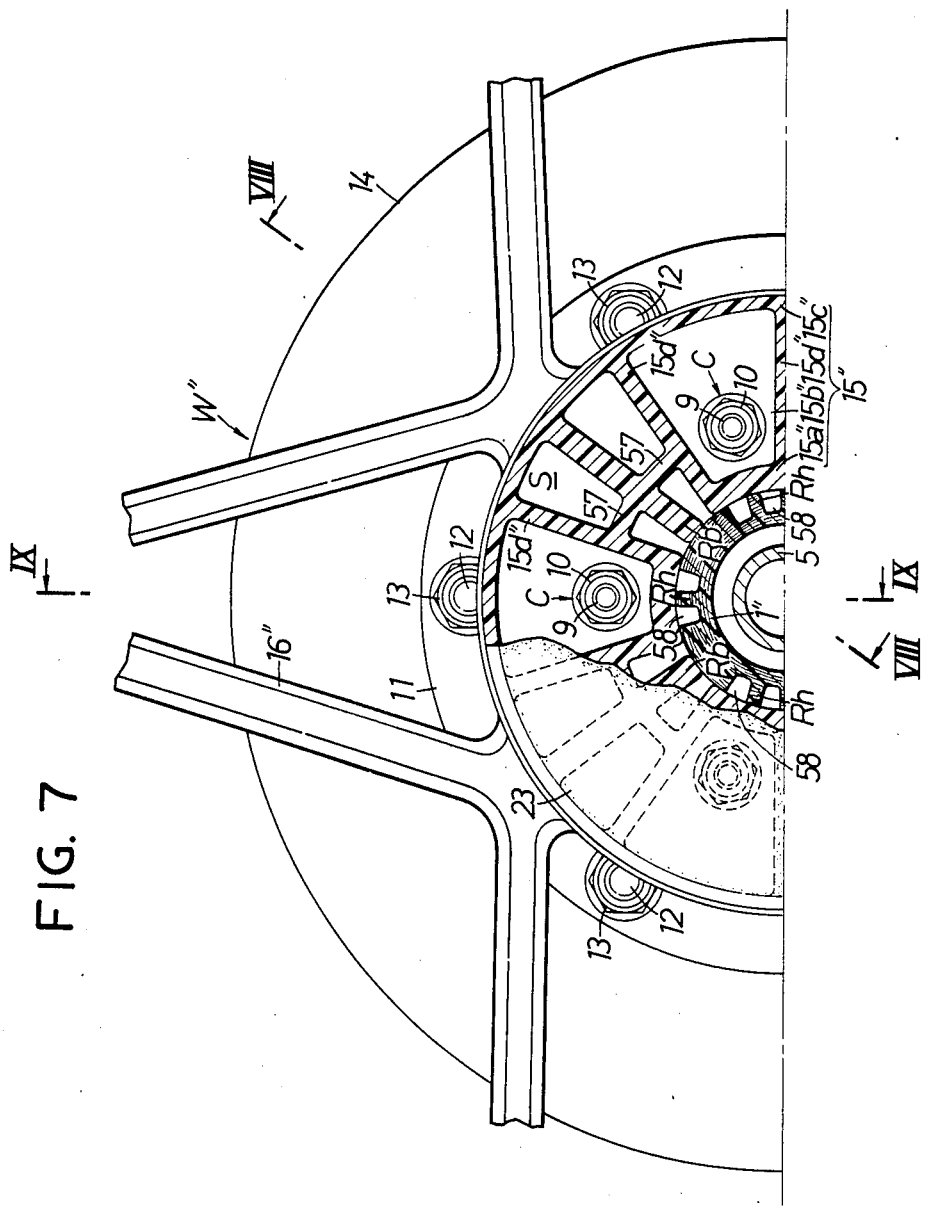
Figure 8:
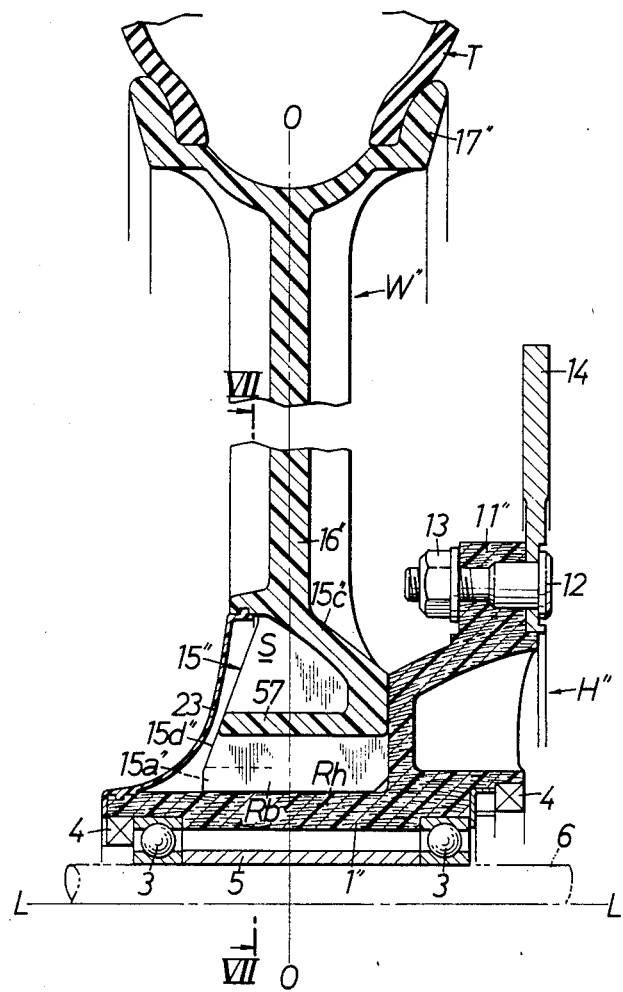
Figure 9:
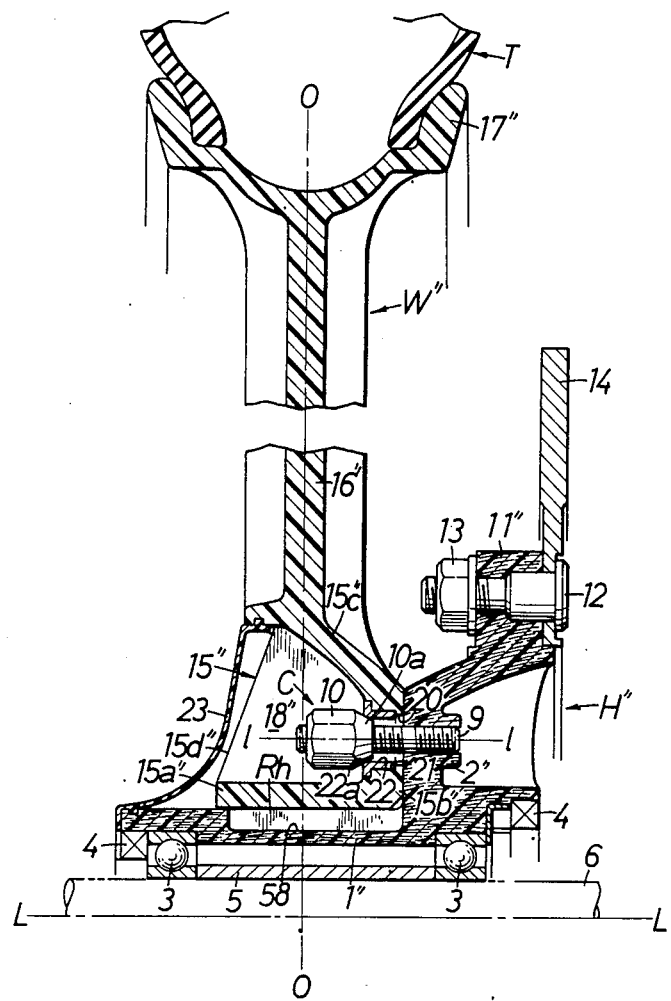

FIGS. 7-9 show a fourth embodiment of the present invention. In this fourth embodiment, a disc brake unit is attached to a built-up wheel, and the basic construction of this embodiment is identical with that of the first embodiment. Therefore, the parts of the fourth embodiment which are the same as those of the first embodiment are designated by the same reference numerals and characters.

In the fourth embodiment, a hub H" in a built-up wheel is formed of a synthetic resin of a high modulus of tensile elasticity, and a wheel body W''' a synthetic resin with a modulus of tensile elasticity lower than that of the resin of the hub H", in the same way as the preceding third embodiment.

In the fourth embodiment, a bearing cylinder 1" is provided on its outer circumferential surface with a plurality of circumferentially-spaced and axially-extending recesses 58, into which hub-side ribs Rh . . . project radially, as shown clearly in FIG. 7. The inner circumferential surface of the bearing cylinder 1" is formed cylindrically and smoothly. In a boss 15" of the wheel body W''', wheel body-side ribs Rb . . . extend radially from the inner surface of an outer cylindrical portion 15c" toward an inner cylindrical portion 15a" in intermediate portions of spaces, each of which spaces is defined between the outer surfaces of two adjacent reinforcing ribs 15d" which cooperate to define combining spaces including fastener means C therein, i.e. spaces S in which the fastener means C are not provided. Radial inner ends of these ribs Rb . . . are on a circle which is concentric with the inner circumferential surface of the inner cylindrical portion 15a".

The wheel body-side ribs Rb . . . and reinforcing ribs 15d" are bridge-connected together by connecting members 57.

When the wheel body W''' is combined with the hub H", the hub-side ribs Rh . . . engage closely with the inner cylindrical portion 15a" of the wheel body W''', and the wheel body-side ribs Rb engage closely with smooth portions, which connect the recesses 58, of the outer circumferential surface of the bearing cylinder 1" of the hub H", as shown clearly in FIG. 7. These ribs Rh . . . , Rb . . . cooperate with each other to improve the strength of the combined portions of the wheel body W''' and hub H".

Accordingly, in the fourth embodiment, a load imparted from a tire T to the wheel body W''' is transmitted to the hub H" in a distributed manner and more effectively via the reinforcing ribs 15d", wheel body-side ribs Rb and hub-side ribs Rh. Consequently, the stress concentration in the fastener means C can be prevented.

As in the third and fourth embodiments, specially-formed ribs are provided on the outer circumferential surface of the hub and the inner circumferential surface of the boss of the wheel body which is fitted around the outer circumferential surface of the hub. Consequently, a load imparted from the tire to the wheel body can be transmitted in a distributed matter more effectively via these ribs, so that the durability of the built-up wheel can be improved. It is the matter of course that the ribs of such a construction can also be applied to built-up wheels of the first and second embodiments, each wheel being constituted by a wheel body of synthetic resin and a metallic hub. Attention should be paid to the fact that the application of these ribs is not necessarily restricted by the kind of materials of which the wheel body and hub are made.

What is claimed is:

1. A built-up wheel for vehicles, comprising a hub, a wheel body formed separately from said hub, and fastener means for detachably connecting said hub and said wheel body with each other, wherein said hub is provided with a bearng cylinder and a wheel support member formed integrally with and extending from said bearing cylinder whereas said wheel body is provided at an outer circumferential portion thereof with a rim on which a tire is to be set, and at an inner circumferential portion thereof with a boss which is connected with said wheel support member by said fastener means, said boss being provided with a inner cylindrical portion formed integrally therewith, said inner cylindrical portion being fitted around an outer circumferential portion of said bearing cylinder and extending in an axial direction of the bearing cylinder, said boss comprising a joint member attached to said wheel support member of said hub by said fastener means, said inner cylindrical portion formed integrally with said joint member and extending from an inner circumferential portion thereof, an outer cylindrical portion formed integrally with said joint member and extending axially from an outer circumferential portion of said joint member, radially extending reinforcing ribs for connecting and reinforcing said inner and outer cylindrical portions.

2. A built-up wheel for vehicles according to claim 1, wherein said bearing cylinder is provided on its outer circumferential portion with a plurality of circumferentially-spaced radially-extending ribs, and said inner cylindrical portion of the boss is fitted over outer end surfaces of said ribs.

3. A built-up wheel for vehicles according to claim 1, wherein said boss is formed to have a cross-section of one-side-opened channel-like recess, said fastener means is housed in said recess, and a cover is put over opened side portion of said recess.

4. A built-up wheel for vehicles according to claim 1 or 3, wherein said fastener means is adapted to connect said wheel support member with said boss unitarily in an axial direction thereof.

5. A built-up wheel for vehicles according to claim 4, wherein said fastener means comprises: a stud bolt implanted in said wheel support member of said hub, said bolt being inserted, when said hub and said wheel body are assembled with each other, through a bolt hole formed in said joint member of said boss, in such a manner that a front end portion of said stud bolt projects from an opposite side surface of said joint member; and a nut screwed to the front end portion of said stud bolt.

6. A built-up wheel for vehicles according to claim 3, wherein said wheel body further has radially-extending spiders for connecting said rim and said boss together unitarily, said inner cylindrical portion extending across a radial center line of said rim and said spiders to have left and right sections with respect to said center line formed of a substantially equal length.

7. A built-up wheel for vehicles according to claim 6, wherein said opened side portion of said boss and said fastener means are provided on opposite sides of said radial center line.

8. A built-up wheel for vehicles according to claim 1 or 3, wherein said wheel body is formed of a synthetic resin material and said hub is formed of a metallic material.

9. A built-up wheel for vehicles according to claim 8, further having a brake unit and a driving unit, these units being mounted to said hub.

10. A built-up wheel for vehicles according to claim 1 or 3, further having a brake unit and a driving unit, these units being mounted to said hub.

11. A built-up wheel for vehicles according to claim 3, wherein said outer cylindrical portion of the boss defines another annular opened side portion in cooperation with said wheel support member at a side of said joint member which is opposite to the side where said recess is formed, said another opened side portion being covered by another cover whose shape is substantially identical with that of said cover.

12. A built-up wheel for vehicles according to claim 1, wherein said wheel body further has radially-extending spiders for connecting said rim and said boss together unitarily, said inner cylindrical portion extending across a radial center line of said rim and said spiders to have left and right sections with respect to said center line formed of a substantially equal length.

13. A built-up wheel for vehicles, comprising a hub supported on a wheel axle and a wheel body, said hub and said wheel body being formed of different kinds of synthetic resin material and unitarily connected with each other, wherein said hub consists of a synthetic resin having a high modulus of tensile elasticity, and said wheel body consists of a synthetic resin having a modulus of tensile elasticity lower than that of the synthetic resin of said hub, wherein said hub and said wheel body are detachably connected with each other by fastener means, said hub is provided with a bearing cylinder and a wheel support member formed integrally with and extending from said bearing cylinder, said wheel body is provided at an outer circumferential portion thereof with a rim on which a tire is set, and at an inner circumferential portion thereof with a boss which is connected with said wheel support member by said fastener means, and wherein said boss is integrally formed with an inner cylindrical portion which is fitted around an outer circumferential surface of said bearing cylinder so as to extend in an axial direction of the bearing cylinder.

14. A built-up wheel for vehicles according to claim 13, wherein said boss of said wheel body comprises a joint member attached to said wheel support member of said hub by said fastener means, said inner cylindrical portion formed integrally with said joint member and extending from an inner circumferential portion thereof, circumferential portion of said joint member, an outer cylindrical portion formed integrally with said joint member and extending axially from an outer circumference portion of said joint member, and radially-extending reinforcing ribs for connecting and reinforcing said inner and outer cylindrical portions.

15. A built-up wheel for vehicles according to claim 13, wherein said bearing cylinder is provided on its outer circumferential portion with a plurality of circumferentially-spaced radially-extending ribs, and said inner cylindrical portion of the boss is fitted over outer end surfaces of said ribs.

16. A built-up wheel for vehicles according to claim 14, wherein said boss is formed to have a cross-section of one-side-opened channel-like recess, said fastener means is housed in said recess, and a cover is put over opened side portion of said recess.

17. A built-up wheel for vehicles according to claim 14 or 16, wherein said fastener means is adapted to connect said wheel support member with said boss unitarily in an axial direction thereof.

18. A built-up wheel for vehicles according to claim 13 or 14, wherein said wheel body further has radially-extending spiders for connecting said rim and said boss together unitarily, said inner cylindrical portion extending across a radial center line of said rim and said spiders to have left and right sections with respect to said center line formed of a substantially equal length.

19. A built-up wheel for vehicles according to claim 16, wherein said wheel body further has radially-extending spiders for connecting said rim and said boss together unitarily, said inner cylindrical portion extending across a radial center line of said rim and said spiders to have left and right sections with respect to said center line formed of a substantially equal length.

20. A built-up wheel for vehicles according to claim 19, wherein said opened side portion of said boss and said fastener means are provided on opposite sides of said radial center line.

21. A built-up wheel for vehicles according to claim 16, wherein said outer cylindrical portion of the boss defines another annular opened side portion in cooperation with said wheel support member at a side of said joint member which is opposite to the side where said recess is formed, said another opened side portion being covered by another cover whose shape is substantially identical with that of said cover.

22. A built-up wheel for vehicles according to claim 17, wherein said fastener means comprises: a stud bolt implanted in said wheel support member of said hub, said bolt being inserted, when said hub and said wheel body are assembled with each other, through a bolt hole formed in said joint member of said boss, in such a manner that a front end portion of said stud bolt projects from an opposite side surface of said joint member; and a nut screwed to the front end portion of said stud bolt.

23. A built-up wheel for vehicles according to claim 13, 14 or 16, further having a brake unit and a driving unit, these units being mounted to said hub.

24. A built-up wheel for vehicles according to claim 13, wherein the synthetic resin constituting said hub has a modulus of tensile elasticity of 3000–70000 kg/mm$^2$.

25. A built-up wheel for vehicles according to claim 13, wherein the synthetic resin constituting said wheel body has a modulus of tensile elasticity of 1000–6000 kg/mm$^2$.

26. A built-up wheel for vehicles according to claim 13 or 25, wherein the synthetic resin constituting said wheel body is selected from the group consisting of a nylon resin, a polycarbonate resin, an ABS resin, a polyacetal resin, and an acetyl cellulose resin.

27. A built-up wheel for vehicles according to claim 13 or 24, wherein the synthetic resin constituting said hub is a carbon fiber epoxy resin 28. A built-up wheel for vehicles, according to claim 1 or 13, wherein a plurality of reinforcing ribs are formed on at least one of said bearing cylinder and said boss.

29. A built-up wheel for vehicles according to claim 13 or 24, wherein the synthetic resin constituting said hub is a boron fiber epoxy resin.

30. A built-up wheel for vehicles, comprising a hub, a wheel body formed separately from said hub, and fastener means for detachably connecting said hub and said wheel body with each other, wherein said hub is provided with a bearing cylinder and a wheel support member formed integrally with and extending from said bearing cylinder whereas said wheel body is provided at an outer circumferential portion thereof with a rim on which a tire is to be set, and at an inner circumferential portion thereof with a boss which is connected with said wheel support member by said fastener means, said boss being provided with an inner cylindrical portion formed integrally therewith, said inner cylindrical portion being fitted around an outer circumferential portion of said bearing cylinder and extending in an axial direction of the bearing cylinder, said bearing cylinder being provided on its outer circumferential portion with a plurality of circumferentially-spaced radially-extending ribs, and said inner cylindrical portion of the boss being fitted over outer end surfaces of said ribs.

* * * * *